F. SHAW.
SHAFT COUPLING.
APPLICATION FILED JULY 23, 1909.

1,140,855.

Patented May 25, 1915.

WITNESSES:
Chas H Young
S. Davis

INVENTOR
Frank Shaw
BY
Parsons Hall Bodell
ATTORNEYS

UNITED STATES PATENT OFFICE.

FRANK SHAW, OF SYRACUSE, NEW YORK.

SHAFT-COUPLING.

1,140,855.

Specification of Letters Patent.

Patented May 25, 1915.

Application filed July 23, 1909. Serial No. 509,107.

*To all whom it may concern:*

Be it known that I, FRANK SHAW, of Syracuse, in the county of Onondaga and State of New York, have invented a certain new and useful Shaft-Coupling, of which the following is a specification.

My invention has for its object the production of a shaft coupling which is particularly simple in construction and highly efficient and durable in use, and may, if desired, be attached to the shafts before they are placed in the hangers; and it consists in the combinations and constructions hereinafter set forth and claimed.

In describing this invention, reference is had to the accompanying drawings, in which like characters designate corresponding parts in all the views.

Figure 1:
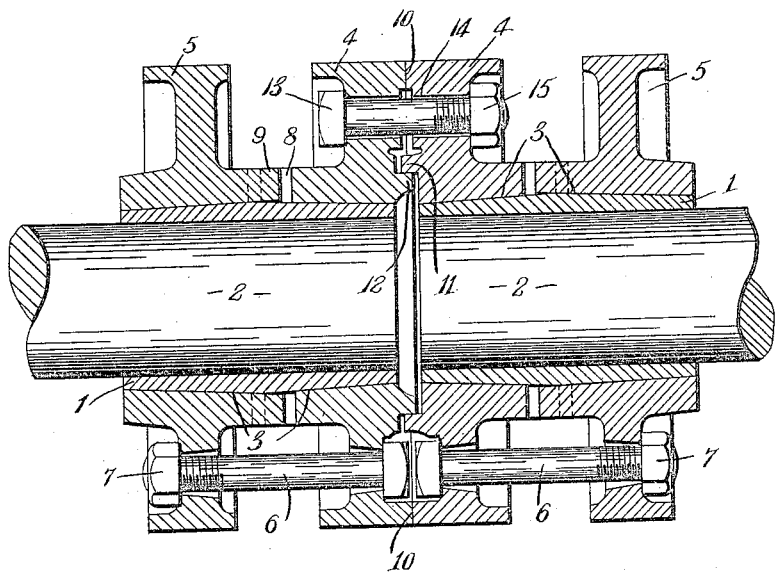
Figure 2:
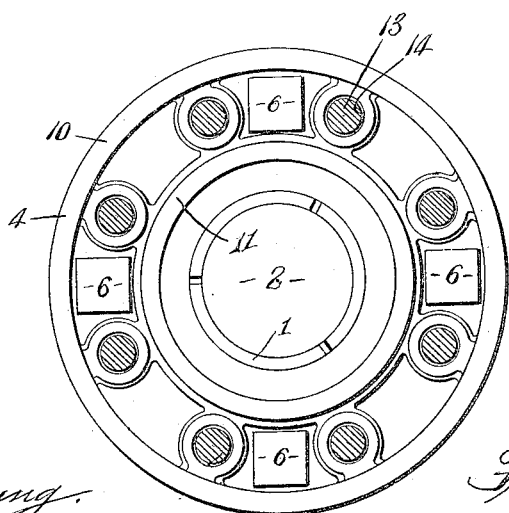

Figure 1 is a longitudinal section, partly in elevation, of my shaft coupling, and the ends of two shafts or shaft sections connected thereby. Fig. 2 is a face view of one section of this coupling, the means connecting the coupling sections being shown in cross-section.

This shaft coupling comprises, generally, two sections associated respectively with the shafts to be coupled together substantially in axial alinement, and means for uniting the sections.

Each section of my coupling comprises a compression sleeve 1 for receiving in its bore the end of one of the shafts 2 to be coupled, and means for compressing said sleeve on the shaft. The compression sleeve may be of any desirable form, size and construction, and may be of one or more pieces, but is preferably substantially similar to the sleeve disclosed in my Patent, No. 674,024, May 14, 1901, being formed with portions 3 tapering from the intermediate part of the sleeve in opposite directions toward the ends thereof. It will be understood, however, that any suitable compression element may be employed in place of the sleeve disclosed in such patent. The means for compressing said sleeve comprises a pair of shells or collars 4, 5 preferably formed with peripheral flanges and mounted respectively on the tapering portions 3 of the sleeve 1 and preferably having their bores tapering in opposite directions and corresponding to such tapering portions 3, and means as bolts 6 passed through the peripheral flanges of the collars 4, 5 and nuts 7 turning on the bolts for drawing the collars 4, 5 toward each other and thereby compressing the sleeve on the shaft. The collars 4, 5 are preferably formed with clutch faces on their opposing sides in order to relieve the bolts 6 from lateral strain, said clutch faces being usually interlocking lugs 8, 9 provided respectively on the collars 4, 5. It will be understood, however, that said clutch faces may be dispensed with, if desired. The collar 4 is also provided with an annular engaging surface 10 near its periphery and on its side nearest the end of the shaft provided with said collar, this surface 10 normally engaging a corresponding surface 10 on the opposing collar 4.

This coupling is preferably formed with means for alining the shafts 2 coupled thereby, said means being here shown as telescoping parts associated respectively with the collars 4, these parts consisting of annular flanges 11, 12 projecting from opposing faces of the collars 4 and being arranged concentric with the axis of the sleeves 1. The flange 11 of one collar is of greater diameter than the flange 12 of the other collar and forms a socket which receives and fits a cylindrical surface on the flange 12. The portions of the collars 4 between said flanges 11, 12 and the engaging surfaces 10 are spaced apart from each other.

The compressing means for one sleeve is connected to the compressing means for the other sleeve by uniting the collars 4, these collars being nearer the abutting ends of the coupled shafts than the collars 5. Said collars 4 are coupled together by bolts 13 operating independently of the bolts 6 and extending through transverse openings 14 in the peripheral flanges on the collars 4 and by nuts 15 turning on the bolts 13, the openings 14 being preferably of slightly larger diameter than the shanks of the bolts 13 in order to facilitate clamping of the collars 4 together. These bolts 13 terminate at points between the planes of the ends of the bolts 6 and are thus relatively short, inexpensive and strong.

In operation, the coupling sections, each including a sleeve 1 and collars 4 and 5, may be placed in position upon the ends of the shafts 2 to be coupled while said shafts are on the floor, and when the shafts have been placed in the bearings of their hangers, the telescoping parts 11, 12 of the coupling sections are fitted together, thus alining the shafts 2 whereupon the collars 4 may be coupled together by the bolts 13.

What I claim, is:—

1. A coupling for rigidly connecting the contiguous ends of two shaft sections disposed in substantially axial alinement, said coupling comprising two split sleeves, one of said sleeves receiving in its bore the end of one of the shaft sections, and the other receiving in its bore the end of the other shaft section, and each sleeve tapering peripherally from an intermediate part thereof toward its opposite ends, a pair of shells associated with each sleeve and having bores tapering in opposite directions, and receiving the opposite ends of the associated sleeve, bolts for drawing the members of each pair of shells toward each other, whereby each sleeve is compressed by the corresponding pair of shells into firm frictional contact with the periphery of the shaft in its bore and independently of the other sleeve and shells and additional bolts for rigidly connecting the shell nearest the end of one shaft with the corresponding shell of the other shaft, said additional bolts terminating at points between the planes of the ends of the first mentioned bolts and operating independently of said first-mentioned bolts, substantially as and for the purpose described.

2. A coupling for rigidly connecting the contiguous ends of two shaft sections disposed in substantially axial alinement, said coupling comprising two split sleeves, one receiving in its bore the end of one shaft section and the other receiving in its bore the end of the other shaft section, and each sleeve tapering peripherally from an intermediate part thereof toward its opposite ends, a pair of shells associated with each sleeve, the members of said pair being provided with bores tapering in opposite directions and each having a peripheral flange, bolts extending through and connecting the flange of one shell to the flange of the companion shell for drawing the members of each pair toward each other, and thereby clamping the associated sleeve upon the end of the shaft in its bore, and independently of the other sleeve and shells, and additional bolts extending through the flanges of the shells nearest the extreme ends of the shafts for rigidly connecting the same, the additional bolts terminating at points between the planes of the ends of the first-mentioned bolts and operating independently of said first-mentioned bolts, substantially as and for the purpose specified.

3. A coupling for rigidly connecting the contiguous ends of two shaft sections disposed in substantially axial alinement, said coupling comprising two split sleeves one receiving in its bore the end of one shaft section and the other receiving in its bore the end of the other shaft section, and each sleeve tapering peripherally from an intermediate part thereof toward its opposite ends, a pair of shells associated with each sleeve, the members of said pair being provided with bores tapering in opposite directions and each having a peripheral flange, bolts extending through and connecting the flange of one shell to the flange of the companion shell for drawing the members of each pair toward each other, and thereby clamping the associated sleeve upon the end of the shaft in its bore, and independently of the other sleeve and shells, and additional bolts extending through the flanges of the shells nearest the extreme ends of the shafts for rigidly connecting the same, the additional bolts terminating at points between the planes of the ends of the first-mentioned bolts and operating independently of said first-mentioned bolts, the last-named flanges having concentrically arranged telescoping surfaces, located between the axes of the shells and the bolts and adapted for alining the shafts as the pairs of shells are drawn toward each other by the last-named bolts, substantially as and for the purpose set forth.

In testimony whereof, I have hereunto signed my name in the presence of two attesting witnesses, at Syracuse, in the county of Onondaga, in the State of New York, this 21st day of July, 1909.

FRANK SHAW.

Witnesses:
S. DAVIS,
H. KAUFMAN.

Copies of this patent may be obtained for five cents each, by addressing the "Commissioner of Patents, Washington, D. C."